US010136373B2

(12) United States Patent
Baudoin et al.

(10) Patent No.: US 10,136,373 B2
(45) Date of Patent: Nov. 20, 2018

(54) SOFT HANDOVER METHOD USING GATEWAY SITES DIVERSITY AND IMPLEMENTED IN A SPACE TELECOMMUNICATION SYSTEM

(71) Applicant: THALES, Courbevoie (FR)

(72) Inventors: Cédric Baudoin, Toulouse (FR); Erwan Corbel, Toulouse (FR); Pierre Tayrac, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/594,579

(22) Filed: May 13, 2017

(65) Prior Publication Data

US 2017/0339616 A1  Nov. 23, 2017

(30) Foreign Application Priority Data

May 20, 2016  (FR) ..................................... 16 00809

(51) Int. Cl.
*H04W 36/18* (2009.01)
*H04B 7/185* (2006.01)
*H04Q 9/04* (2006.01)
*H04W 36/02* (2009.01)
*H04W 88/16* (2009.01)
*H04W 36/00* (2009.01)

(52) U.S. Cl.
CPC .......... *H04W 36/18* (2013.01); *H04B 7/1851* (2013.01); *H04B 7/18517* (2013.01); *H04Q 9/04* (2013.01); *H04W 36/023* (2013.01); *H04W 36/0016* (2013.01); *H04W 36/0055* (2013.01); *H04W 88/16* (2013.01)

(58) Field of Classification Search
CPC ....... H04B 7/18582; H03F 1/32; H04W 36/18
See application file for complete search history.

(56) References Cited

U.S. PATENT DOCUMENTS

| 6,230,013 | B1 * | 5/2001 | Wallentin | ............. H04W 36/12 455/436 |
| 9,026,042 | B1 * | 5/2015 | Nemeth | ............. H04B 7/18582 455/12.1 |
| 2004/0066347 | A1 * | 4/2004 | Schiff | ................ H04B 7/18513 343/776 |

(Continued)

OTHER PUBLICATIONS

Muhammad et al., "Network-Coding-Based Gateway Handover Scheme for Terabit Satellite Networks", 31st AIAA International Communications Satellite Systems Conference, Oct. 14, 2013, Reston, VA.*

(Continued)

*Primary Examiner* — Myron K Wyche
(74) *Attorney, Agent, or Firm* — Baker & Hostetler LLP

(57) ABSTRACT

A soft handover method with gateway site diversity between a first nominal gateway to a relay satellite of a space telecommunication system and a second redundant gateway to the same satellite comprises a soft handover preparation phase, and a soft handover execution phase that are executed in succession. During the execution phase, a first switchover of the traffic at the ground segment level to the second redundant gateway, and a second switchover at the level of the segment on board the satellite between a first nominal access link of the first nominal gateway and a second redundant access link of the second redundant gateway are finely synchronized.

14 Claims, 3 Drawing Sheets

(56) References Cited

U.S. PATENT DOCUMENTS

2012/0156988 A1* 6/2012 Mouchon .................. H03F 1/32
455/13.4

OTHER PUBLICATIONS

Muhammad Muhammad et al., "Network-Coding-Based Gateway Handover Scheme for Terabit Satellite Networks," 31st AIAA International Communications Satellite Systems Conference, Oct. 14, 2013, XP055170613.

* cited by examiner

SOFT HANDOVER METHOD USING GATEWAY SITES DIVERSITY AND IMPLEMENTED IN A SPACE TELECOMMUNICATION SYSTEM

CROSS-REFERENCE TO RELATED APPLICATION

This application claims priority to foreign French patent application No. FR 1600809, filed on May 20, 2016, the disclosure of which is incorporated by reference in its entirety.

FIELD OF THE INVENTION

The present invention relates to a soft handover method with gateway diversity for handing over telecommunications data traffic from a first nominal gateway to a relay satellite of a space telecommunications system to a second redundant gateway to the same satellite, when a first access link of the first gateway undergoes or will undergo an attenuation which does not allow the first gateway to ensure a correct transmission of the traffic to the satellite.

The invention relates also to a space telecommunication system, configured to implement the method for soft handover of telecommunications traffic between the first nominal gateway and the second redundant gateway.

The technical field in which the invention is applied is that of the space telecommunication systems, and more particularly those using the bands of high frequencies lying in the Q/V and W bands, because of the increase in capacity resulting from such use. The V band is defined as the band for the radio frequencies lying between 47.2 and 51.4 GHz whereas the Q band is defined as the band for the radio frequencies lying between 37.5 and 42.5 GHz. These frequency bands are characterized by very significant attenuation levels, caused by cloud obstruction and of the order of 20 to 30 dB for example for the Q/V bands according to the availability of the transmission concerned. Such attenuation levels cannot be taken over by just conventional means, that is to say those using power control and/or adaptive modulation/coding. This is why, for the space telecommunication systems operating in these high bands, solutions of site diversity with gateway handover are implemented to ensure the availability of the system.

BACKGROUND

As is known, there are three types of solutions for performing a handover of the traffic from one gateway to another:
  a handover of the first type, called unsynchronized handover,
  a handover of the second type, called "break before make handover", and
  a handover of the third type, called "make before break handover".

The unsynchronized solutions of the first type are those which are conventionally implemented in maintenance operations where a backup gateway will act as active nominal gateway for the period of its maintenance. This operation is not finely synchronized between the on board and ground segments, that is to say between the satellite and the terrestrial component of the space telecommunication system, and results in the disconnection of all of the terminals, users of the telecommunication service, with a very significant impact on service.

The solutions of the second type, that is to say those called "break before make" consist in stopping the current access link on the first nominal gateway, then in performing an on board switchover, that is to say at the satellite level, between two access links to the satellite, before activating the second redundant gateway. This type of solution has the advantage of being simple to implement but involves a significant service outage since the operations of this type of handover are performed successively in series.

The solutions of the third type, that is to say those called "make before break" consist in starting up the service on the second redundant gateway as quickly as possible before the on board switchover of the access links. This type of solution involves significant data packet losses in the first nominal gateway, specifically the packets which are in the buffer memories at the moment of the on board switchover, and losses on the new access link because of the loss of synchronization of the user terminals of the satellite system after the on board switchover while a new synchronization for each of the terminals is being re-established.

The technical problem resolved by the invention is how to propose a method for soft handover of data traffic between a first nominal satellite gateway and a second redundant satellite gateway of a space telecommunication system which minimizes the impact on the telecommunication service by reducing the outage times of the gateway-satellite link and/or by avoiding a fine synchronization between the first nominal gateway and the second redundant gateway, thus reducing the data losses in the buffer memories of said gateways and the additional latency introduced, and/or by reducing the time needed to resynchronize the terminals while minimizing the losses of data which could be induced by the user terminals.

SUMMARY OF THE INVENTION

To this end, the subject of the invention is a soft handover method with gateway site diversity for handing over telecommunication data traffic between a first nominal gateway to a relay satellite of a space telecommunication system to a second redundant gateway to the same satellite when a first access link of the first nominal gateway undergoes or will undergo an attenuation which does not allow the first nominal gateway to ensure a correct transmission of the traffic to the satellite. The handover method is characterized in that it comprises a handover preparation phase and a handover execution phase, which is then executed, in which a first switchover of the traffic at the ground segment level between the first nominal gateway and the second redundant gateway, and a second switchover at the level of the segment on board the satellite between the first nominal access link and a second redundant access link from the second redundant gateway to the satellite are finely synchronized with one another.

According to particular embodiments, the soft handover method with gateway site diversity comprises one or more of the following features:
  the first switchover of the traffic at the ground segment level between the first nominal gateway and the second redundant gateway is executed before the second switchover at the level of the segment on board the satellite between the first nominal access link and the second redundant access link are synchronized, and from the first switchover at the ground segment level of the data traffic to the second redundant gateway, the first nominal gateway and the second redundant gateway are simultaneously active, and both remain active until the start of the second switchover at the level of the segment on board to the second redundant access link, where only the first nominal gateway is then deactivated;

the first switchover of the traffic at the ground segment level between the first nominal gateway and the second redundant gateway is executed before the second switchover at the level of the segment on board the satellite between the first nominal access link and the second redundant access link are synchronized, and from the first switchover at the ground segment level of the data traffic to the second redundant gateway, the second redundant gateway buffers the incoming data traffic switched over at the ground level by a sufficient number of empty frames to allow satellite terminals of the space telecommunication system to be resynchronized as quickly as possible;

in parallel, the first nominal gateway empties a buffer memory containing the traffic data not yet transmitted at the moment of the start of the first switchover of the traffic at the ground level between the first and second gateways;

the preparation phase comprises a step of configuration of the second redundant gateway with the configuration of the first nominal gateway;

the preparation phase comprises a step of sending of a satellite remote control TC to the satellite to modify all of the on board switching matrix of the satellite at a specified switching date;

the preparation phase comprises a step of sending of a satellite remote control TC to the satellite to modify all of the on board switching matrix of the satellite at a specified switching date, followed by a step of configuration of the second redundant gateway with the configuration of the first nominal gateway;

the soft handover method with gateway diversity defined above comprises a step of decision-making on the performance of a soft handover with gateway diversity on the basis of a forecast of the events of unavailability of the first nominal access link supplied by the first nominal gateway based on a weather forecast model or an estimator of the channel supported by the first nominal access link, the second redundant gateway on which the handover will take place, the date and the duration of the handover being identified in the handover decision.

Another subject of the invention is a space telecommunication system for softly handing over telecommunication data traffic between a first nominal gateway to a space telecommunication relay satellite to a second redundant gateway to the same satellite when a first access link from the first nominal gateway undergoes or will undergo an attenuation which does not allow the first nominal gateway to ensure a correct transmission of the traffic to the satellite. The space telecommunication system comprises: the telecommunications relay satellite, and the first nominal gateway and the second redundant gateway, and a high bit rate ground network infrastructure interconnecting gateways and supplied with data traffic at a predetermined network entry point, and a plurality of space terminals using telecommunications services, and a coordination and control station of the space telecommunications system, and a TMTC station for receiving telemetry information TM and transmitting remote controls TC from and to the satellite. The space telecommunication system is characterized in that it is configured to implement a soft handover method comprising a handover preparation phase and a handover execution phase that are executed in succession, a first switchover of the traffic at the ground segment level from the first nominal gateway to the second redundant gateway, and a second switchover at the level of the segment on board the satellite between the first nominal access link and a second redundant access link from the second redundant gateway being finely synchronized during the soft handover execution phase.

According to particular embodiments of the invention, the space telecommunication system comprises one or more of the following features:

the first nominal gateway, the second redundant gateway and the satellite are configured to synchronously execute the first switchover of the traffic at the ground segment level between the first nominal gateway and the second redundant gateway before the second switchover at the level of the segment on board the satellite between the first nominal access link and the second redundant access link; and the first nominal gateway and the second redundant gateway are configured to be simultaneously active from the start of the first switchover at the ground segment level of the data traffic to the second redundant gateway, to both remain active until the second switchover at the level of the on board segment to the second redundant access link, only the first nominal gateway being deactivated during and after the second switchover at the level of the segment on board the satellite;

the first nominal gateway, the second redundant gateway and the satellite are configured to synchronously execute the first switchover of the traffic at the ground segment level between the first nominal gateway and the second redundant gateway before the second switchover at the level of the segment on board the satellite between the first nominal access link and the second redundant access link; and the second redundant gateway is configured to, from the first switchover at the ground segment level of the data traffic to the second redundant gateway, buffer the incoming data traffic switched at the ground level by a sufficient number of empty frames to be transmitted to allow the satellite terminals of the satellite telecommunication system to be resynchronized as quickly as possible;

the first nominal gateway is configured to, from the start of the first switchover of the traffic at the ground level to the second redundant gateway, empty at least one of its buffer memories containing the traffic data not yet transmitted at the moment of the start of the first switchover of the traffic at the ground level between the first and second gateways;

the coordination and control station of the space telecommunication system is configured to take a decision to perform a soft handover with gateway diversity on the basis of a forecast of the events of unavailability of the first nominal access link of the first nominal gateway, said forecast being determined on the basis of a weather forecast model or an estimation of the state of the channel supported by the first nominal access link, an identification of the second redundant gateway on which the handover will take place, the date and the duration of the handover being identified in said handover decision, and to control and carry out a scheduling of the steps of the handover preparation phase, said preparation phase comprising a step of sending of a satellite remote control TC to the satellite to modify all of the on board switching matrix of the satellite at a specified switching date, and a step of configuration of the second redundant gateway with the configuration of the first nominal gateway;

the synchronization between the first switchover of the traffic at the ground segment level to the second redundant gateway, and the second switchover at the level of the segment on board the satellite between the first nominal access link and the second redundant access link is prepared by the coordination and control station, through the sending by the coordination and control station to the first and second gateways of a time set point of the instant of triggering of the traffic switchover at the ground segment level, and through the sending by the remote control transmission station TC of a satellite remote control TC to the satellite to modify all of the on board switching matrix of the satellite at a specified switching date by said coordination and control station.

BRIEF DESCRIPTION OF THE DRAWINGS

The invention will be better understood on reading the following description of a single embodiment, given purely as an example and with reference to the drawings in which.

DETAILED DESCRIPTION

Figure 1:
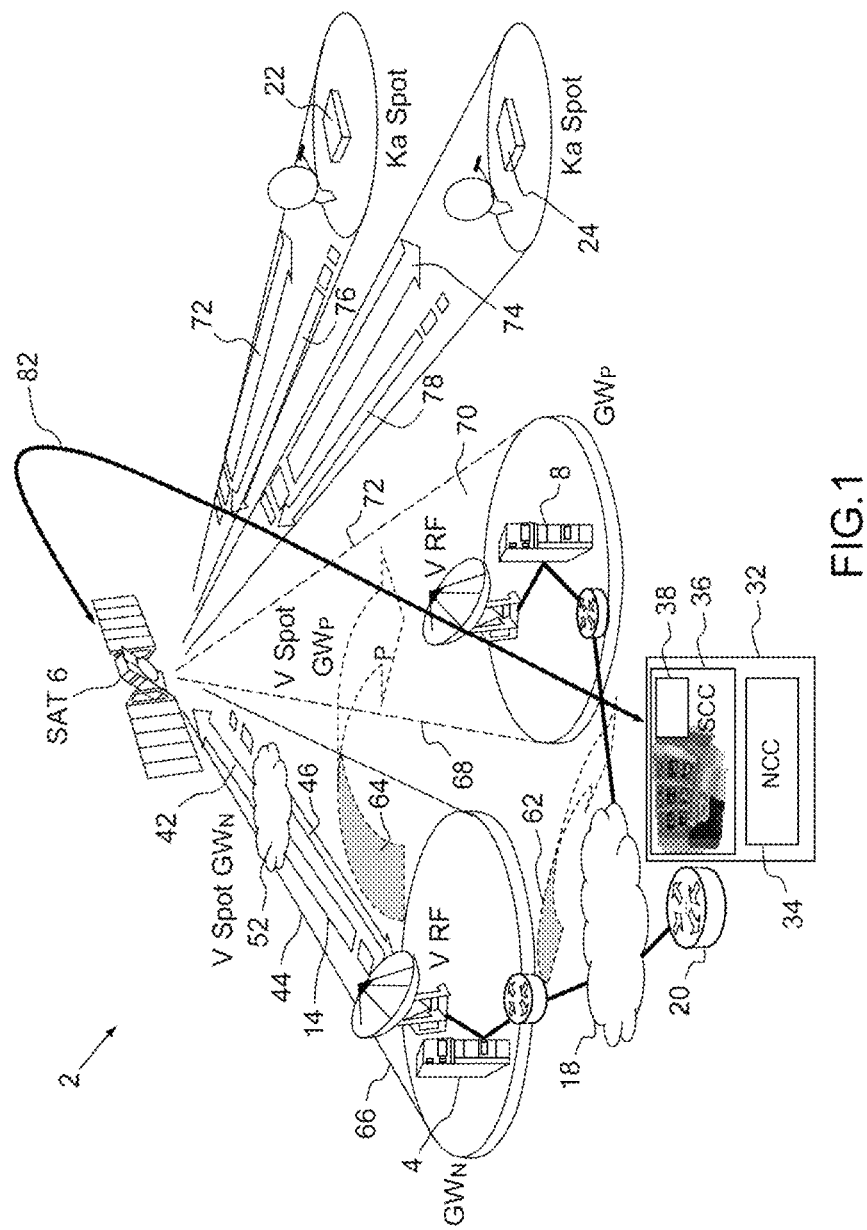
FIG. 1 is a view of a space telecommunication system configured to implement the soft traffic handover method with gateway site diversity according to the invention.

According to FIG. 1, a space telecommunication system 2 is configured to softly hand over telecommunications data traffic from a first nominal gateway 4, also denoted $GW_N$, to a relay space telecommunications satellite 6, to a second redundant gateway 8, also designated $GW_P$, to the same satellite 6, when a first access link 14 of the first gateway 4 undergoes or will undergo an attenuation which does not allow the first nominal gateway 4 to ensure a correct transmission of the traffic to the satellite 6.

The space telecommunication system 2 comprises the telecommunications relay satellite 6, the first nominal gateway 4 and the second redundant gateway 8, and, where appropriate, other gateways GW not represented in FIG. 1, and a high bit rate ground infrastructure 18 interconnecting the gateways 4 $GW_N$, 8 $GW_P$, GW with one another in a network, the interconnecting ground infrastructure 18 of the networked gateways being connected to a conventional ground telecommunications network, not represented, through a gateway 20.

The space telecommunication system 2 also comprises a plurality of space terminals 22, 24 using telecommunication services, also denoted ST, two user space terminals 22, 24 only being represented here.

The space telecommunication system 2 also comprises a coordination and control centre 32 of the space telecommunication system, consisting of a network control centre 34 NCC of the gateway interconnection ground infrastructure 18, and a control centre 36 SCC (Satellite Control Centre) of the satellite 6. Here, particularly, the control centre 34 NCC of the interconnection ground infrastructure 18 and the control centre 36 SCC of the satellite 6 are situated on one and the same geographic site.

The space telecommunication system 2 also comprises a TMTC station 38 for receiving telemetry information TM and transmitting remote controls TC, from and to the satellite 6. Here in FIG. 1 and particularly the TMTC station 38 is situated on the same geographic site as that of the control centre 36 SCC of the satellite 6. As a variant, the two geographic sites can be different and very far from one another.

When the first access link 14 of the first nominal gateway 4 to the satellite 6 is established, the first nominal gateway 4 is activated and transmits the traffic data over a main uplink 42 to the satellite 6 on account of the activation of a satellite reception spot 44 by the satellite 6 by configuring the matrix of the coverages of the satellite appropriately.

Here, the uplink 42 is qualified as main in order to take account of the existence of a downlink 46 serving as return channel for signalling data of lower bit rate than the bit rate of the data of the telecommunications service. Here in FIG. 1 and by way of example, the band of frequencies used on the uplink is the V band of frequencies lying between 47.2 and 53.4 GHz whereas the band of frequencies used on the downlink is the Q band of the frequencies lying between 37.5 and 42.5 GHz. To simplify FIG. 1, the satellite transmission spot of the downlink 46 is not represented, the coverage on the ground of this satellite transmission spot not represented being assumed congruent with the coverage of the satellite reception spot 44.

Hereinbelow, the access link of any gateway GW will mainly denote, unless specified differently, the access link of the uplink 42 from the gateway GW to the satellite 6.

As a variant, the band of frequencies used on the uplink is the V band whereas the band of frequencies used on the downlink is the Ka band.

As a variant, the bands of frequencies used on the uplink and on the downlink are optical bands.

According to FIG. 1, a set of clouds or cloud coverage 52, interposed between the first nominal gateway and the satellite 6, on the line of visibility of the satellite, indicates the existence of a severe degradation of the propagation conditions and a high attenuation of the radiofrequency signals of the first access link 14. Thus, it is necessary to perform, as soon as possible, a soft handover of the telecommunications traffic to another gateway.

According to FIG. 1, the site of installation of the second redundant gateway exhibits favourable propagation conditions because of the absence of clouds obstructing the line of visibility of the satellite 6 with respect to the second redundant gateway 8. Consequently, the second redundant gateway 9 can be used as a gateway on which to perform the soft handover of telecommunications traffic.

According to FIG. 1, it appears that two switchovers of different types have to be able to be performed to implement the handover, a first switchover of the first type at the ground segment level followed by a second switchover of the second type at the level onboard the satellite.

The first switchover of the traffic at the ground segment level from the first nominal gateway to the second redundant gateway is represented in FIG. 1 in a virtual state of realization by a first arrow 62 having a dotted line outline.

The second switchover of the traffic at the level of the segment onboard the satellite from the first nominal access link to the satellite to the second redundant access link to the satellite is represented in FIG. 1 in a virtual state of realization by a second arrow 64 having a dotted line outline.

The second arrow 64 illustrates the second switchover at the onboard level as a transition from the first satellite reception beam 44 currently activated, corresponding to the first nominal access link 14 currently activated and of which a cross section of the outline surface 66 is drawn in a solid line to a second virtual satellite reception beam 68 to be activated, corresponding to a second redundant access link 70 of the second redundant gateway 8 to which to hand over and of which a cross section of the outline surface 72 is drawn by dotted lines.

Thus, the space telecommunications system 2 is configured to implement a soft handover method which comprises a handover preparation phase followed by a handover execution phase.

The first nominal gateway 4, the second redundant gateway 8 and the satellite 6 are configured to synchronously execute the first switchover of the traffic at the ground segment level between the first nominal gateway 4 and the second redundant gateway 8 before the second switchover at the level of the segment onboard the satellite 6 between the first nominal access link 14 and the second redundant access link 70.

The first nominal gateway 4 and the second redundant gateway 8 are configured to be simultaneously activated from the switchover at the ground segment level of the data traffic to the second redundant gateway 8, to both remain active until the switchover at the level of the onboard segment to the second redundant access link 70, only the first nominal gateway 4 being deactivated when the switchover at the level of the segment onboard the satellite 6 has taken place and is finished.

According to FIG. 1, it is noteworthy that, before implementing the soft handover of traffic between the first nominal gateway 4 and the second redundant gateway 8, service traffic downlinks 72, 74, for example in Ka band, are established respectively from the satellite to the user space terminals 22, 24, and that return signalling uplinks 76, 78 are also and respectively established from the user space terminals 22, 24 to the satellite. When the soft handover of traffic with gateway site diversity 6 takes place and the switchover at the level of the segment onboard the satellite 6 between the first nominal access link 14 and the second redundant access link 70 is executed, the service traffic downlinks 72, 74 to the user terminals 22, 24 and the signalling return uplinks 76, 78 from the terminals 22, 24 to the satellite 6 are interrupted. The result thereof is a loss of synchronization of the user terminals 22, 24 of the space telecommunications system 2 and a re-establishment of a new synchronization for each of the terminals 22, 24 for which the aim is to minimize the duration.

In order to reduce the resynchronization time of each of the terminals 22, 24, the second redundant gateway 8 is configured to, from the switchover at the ground segment level of the data traffic to the second redundant gateway 8, buffer the incoming data traffic switched at the ground level by a sufficient number of empty frames to be transmitted, and thus allow satellite terminals 22, 24 of the satellite telecommunication system to be resynchronized as quickly as possible.

In order to reduce the loss of data in the buffer memory of the first nominal gateway 4, the first nominal gateway 4 is configured to, from the start of the switchover of the traffic at the ground level between the first and second gateways 4, 8 and before the start of the switchover at the onboard level of the beams or of the access links 14, 70, empty a buffer memory containing the traffic data not yet transmitted at the moment of the start of the switchover of the traffic at the ground level between the first and second gateways 4, 8.

The coordination and control station 32 of the space telecommunications system 2 is configured to take a decision on performing a soft handover with gateway diversity on the basis of a forecast of the events of unavailability of the first nominal access link 14 of the first nominal gateway 4. This decision is taken on the basis of a weather forecast model or of an estimation of the state of the channel, supported by the first nominal access link. An identification of the second redundant gateway, here the second access link 70, on which the handover will take place, a date and a duration of the handover, are mentioned and described accurately in the handover decision in order to be used as information data allowing the implementation of the handover.

The coordination and control station 32 of the space telecommunications system is also configured to control and produce a scheduling of the steps of the handover preparation phase in which a step of sending of a satellite remote control TC to the satellite to modify all of the onboard switching matrix of the satellite 6 at a specified switching date, followed by a step of configuration of the second redundant gateway 8 with the configuration of the first nominal gateway are executed.

The configuration of the second gateway 8, once performed, contains the configuration parameters of the first nominal gateway 4 existing just before the start of the execution of the first switchover. These parameters include radiofrequency RF information data such as the frequency band, the power, and include the context of the terminals, notably the access identifier, network, logon, service agreement (SLA), parameters concerning the scheduler and the management of the transmission resources, modulation/coding parameters for each of the space terminals of the space telecommunication system 2.

According to FIG. 1, a third arrow 82 represents the sending of a satellite remote control TC to the satellite with verification of the correct reception thereof to modify all of the onboard switching matrix of the satellite 6 at a specified switching date. Preferably, the sending of this remote control, performed by the TMTC station 38 for transmitting remote controls TC, takes place before the configuration of the second redundant gateway 8 with the configuration of the first nominal gateway 4.

The synchronization between the first switchover of the traffic at the ground segment level between the first nominal gateway 4 and the second redundant gateway 8, and the second switchover at the level of the segment onboard the satellite 6 between the first nominal access link 14 and the second redundant access link 70 is prepared by the coordination and control station 32. This preparation is implemented through the sending, by the coordination and control station to the first and second access stations 4, 8, of a common instant of triggering of the first switchover of the traffic at the ground segment level, and through the sending, by the station transmitting remote controls TC 38, of a satellite remote control TC to the satellite to modify all of the onboard switching matrix of the satellite at a switching date, specified by the coordination and control station 32.

Figure 2:
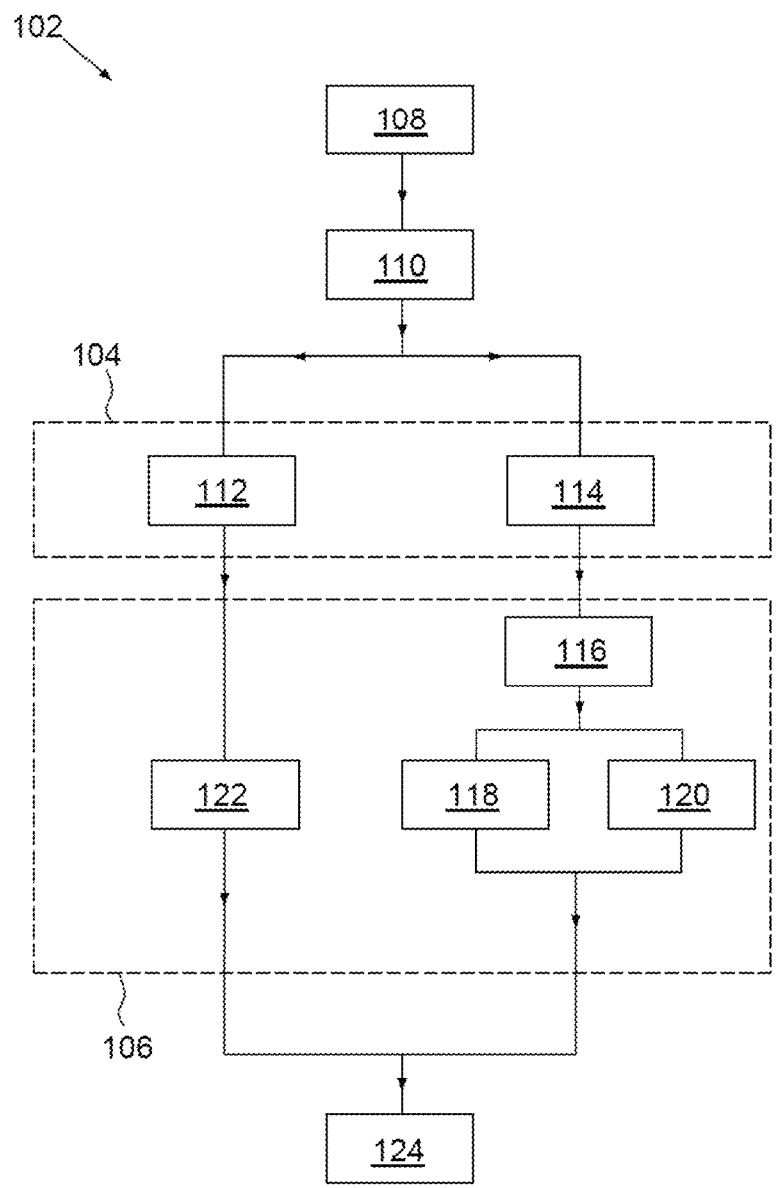
FIG. 2 is a flow diagram of a soft traffic handover method with gateway site diversity according to the invention.

According to FIG. 2, a soft handover method 102 with gateway site diversity for handing over telecommunications data traffic between the first nominal gateway 4 to the relay satellite 6 of the space telecommunication system 2 to the second redundant gateway 8 to the same satellite 6 is implemented when the first access link 14 of the first nominal gateway 4 undergoes or will undergo an attenuation which does not allow the first nominal gateway 4 to ensure a correct transmission of the traffic to the satellite 6.

The handover method 102 comprises a handover preparation phase 104 and a handover execution phase 106, executed in succession, in which the first switchover of the traffic at the ground segment level between the first nominal gateway 4 and the second redundant gateway, and the second switchover at the level of the segment onboard the satellite between the first nominal access link 14 and the second redundant access link 70 are synchronized.

The handover method 102 comprises a set of steps 108, 110, 112, 14, 116, 118, 120, 122, 124.

In a first step 108, a forecast of events of unavailability of the first nominal access link 14 of the first nominal gateway 4 is performed on the basis of a weather forecast model or an estimator of the channel supported by the first nominal access link 14.

Then, in a second step 110, a decision to perform a soft handover with gateway diversity is taken on the basis of the events of unavailability, forecast in the first step 102 and concerning the first nominal access link 14 of the first nominal gateway 4. In the handover decision, the second redundant gateway 8 on which the handover will take place, the date and the duration of the handover are identified.

Then, in the soft handover preparation phase 104 and in parallel, a third step 112 and a fourth step 114 are executed.

In the third step 112, the TMTC station 38 for transmitting remote controls TC, sends a satellite remote control TC to the satellite 6 to modify all of the onboard switching matrix of the satellite 6 at a switching date, specified by the coordination and control station 32.

In the fourth step 114, the second redundant gateway 8 is configured with the configuration of the first nominal gateway 4.

Preferably, the sending of the remote control TC to the satellite 6 takes place before the configuration of the second redundant gateway 8 with the configuration of the first nominal gateway 4.

Then, in the soft handover execution phase 106, in a fifth step 116 of switchover at the ground level, the data traffic is switched over to the second redundant gateway 8.

From the first switchover at the ground segment level of the data traffic to the second redundant gateway 8, in a sixth step 118, the second redundant gateway 8 buffers the incoming data traffic switched at the ground level by a sufficient number of empty frames to allow satellite terminals 22, 24 of the satellite telecommunications system to be resynchronized as quickly as possible.

From the start of the first switchover at the ground segment level and in parallel, in a seventh step 120, the first nominal gateway empties its buffer memory containing the traffic data not yet transmitted at the moment of the start of the first switchover of the traffic at the ground level between the first and second gateways 4, 8.

Thus, from the start of the first switchover at the ground segment level of the data traffic to the second redundant gateway 8, the first nominal gateway 4 and the second redundant gateway 8 are simultaneously active, and both remain active until the second switchover at the level of the onboard segment to the second redundant access link 70, where only the first nominal gateway 4 is then deactivated.

Then, in an eighth step 122, the second switchover at the level of the segment onboard the satellite between the first nominal access link 14 and the second redundant access link 70 is performed. This second switchover is performed in parallel for the access link on the go uplink and for the downlink. In this eighth step 122, the second satellite reception beam 68 (uplink) of the second redundant access link 70 and the second satellite transmission beam (downlink) of the second redundant access link are activated whereas the first satellite reception beam 44 (uplink) of the first redundant access link and the first satellite transmission beam (downlink) of the first redundant access link 14 are deactivated. Once the second switchover is performed, the first nominal access link 14 of the first nominal gateway 4 is no longer active, and the second redundant access link 70 of the second redundant gateway 8 is active.

Then, in the ninth step 124, the satellite terminals 22, 24 begin to receive the empty frames transmitted by the second redundant gateway 70 allowing the resynchronization of the modems of said satellite terminals 22, 24. The satellite terminals 22, 24 are then resynchronized on the go link 72, 74. The satellite terminals 22, 24 then receive signalling over the go link enabling them to reuse the return link. The space telecommunication system 2 then has once again reached a state of nominal operation.

Figure 3:
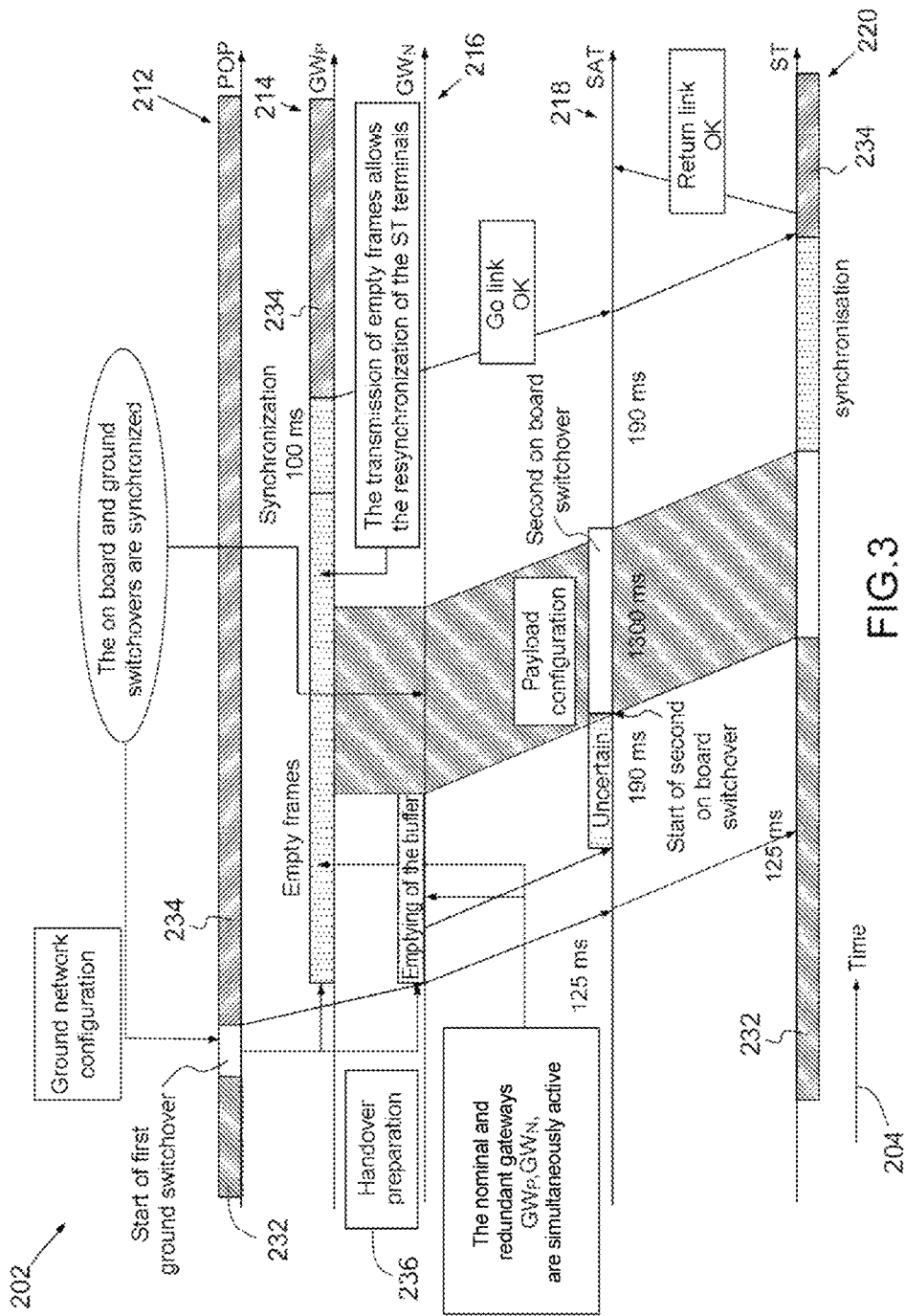
FIG. 3 is a time chart of scheduling of the actions performed in the context of the soft handover method according to the invention by the various elements of the space telecommunication system of FIG. 1, involved in the implementation of the soft handover method.

According to FIG. 3, a temporal scheduling diagram 202 describes the temporal sequencing, on a horizontal time axis 204 of FIG. 3, actions performed in the context of the handover method 102 according to the invention by the various elements of the space telecommunications system 2 of FIG. 1 involved in the implementation of the handover method. These elements form waypoints, temporally sequenced, for the traffic data and are schematically arranged from top to bottom in the diagram according to transit times separating said points from one another. The elements are as follows: the point of interconnection to the service network POP, the second redundant gateway 8 $GW_P$, the first nominal gateway 4 $GW_N$, the satellite 6 SAT, a satellite terminal, for example the satellite terminal 22. Temporal frames of data 212, 214, 216, 218, 220 respectively correspond to the elements POP, $GW_P$, $GW_N$, SAT and ST.

According to FIG. 3, a first flow of data 232 before the first switchover at the ground segment level and a second flow of data 234 switched after the first switchover at the ground segment level are represented respectively by a first shading pattern and a second shading pattern that are different to one another.

According to FIG. 3, the handover preparation phase 104 at the ground level is represented by a box 236 arranged before the steps of sending of the empty frames by the second redundant gateway and of emptying of the buffer memory of the first nominal gateway, represented subjacently by the frames 214, 216.

According to FIG. 3, the first feature of the soft handover method according to which the first switchover at the ground segment level to the second redundant gateway 8 and the second switchover at the onboard level to the second redundant beam of the second redundant access link are finely synchronized upon the execution of the switchover is highlighted. The instant of triggering of the second switchover at the onboard level is chosen after the instant of the first effective ground switchover of the traffic to the second redundant gateway 8 where the first nominal gateway 4 remains active and continues to transmit to empty its buffer memory.

According to FIG. 3, the second feature of the soft handover method according to which the first nominal gateway 4 and the second redundant gateway 8 are simultaneously active from the instant of the first effective ground switchover of the traffic to the second redundant gateway 8 is also highlighted.

According to FIG. 3, the third feature of the soft handover method according to which empty frames are transmitted by the second redundant gateway 8 to the satellite terminals via the satellite 6 before sending them the empty packets or frames previously buffered so as to allow the satellite terminals 22, 24 to be resynchronized as quickly as possible is also highlighted.

The temporal frames described and their arrangement thus make it possible to perform a handover with gateway site diversity through a synchronized switchover between the onboard and the ground segments. This handover of traffic between gateways is performed flexibly or softly since the two gateways are active simultaneously, the effective handover of the traffic to the satellite terminals depending on the start date and on the duration of the second onboard switchover. Finally, the sending of empty frames over the new traffic data routing path makes it possible to speed up the resynchronization of the terminals and therefore the restarting of the telecommunications service.

The method described above in FIGS. 1 to 3 offers several advantages. On the one hand, the fine onboard-ground synchronization makes it possible to minimize the outage time of the gateway-satellite link and therefore reduce the impact of the handover on the telecommunications service, supplied to the user. Also, the fine onboard-ground synchronization also makes it possible to perform a flexible handover which does not require a fine synchronization between the first nominal gateway and the second redundant gateway. These two gateways are active and operate in parallel in order to minimize the data losses in the buffer memories and the additional latency introduced. Finally, the sending by the second redundant gateway of empty frames makes it possible to minimize the time needed for resynchronization of the satellite terminals while minimizing the losses of data which could be induced by the non-operational state of the satellite terminals.

A fine synchronization between the first switchover at the ground level and the second switchover onboard the satellite involves an accurate synchronization of the first switchover operations and of the second switchover operations on one and the same reference clock or control shared by the satellite and the two gateways. In particular, this accurate or fine ground-onboard synchronization must make it possible to control and monitor the time between the start of the first switchover and the start of the second switchover, this time being predetermined and implemented by the coordination and control centre through the sending to the first and second gateways of a temporal setpoint of the instant of the first switchover of the traffic at the ground segment level, and through the sending to the satellite of a specified date of switchover of the uplink beam by modification of all of the onboard switching matrix of the satellite.

The invention claimed is:

1. A soft handover method with gateway site diversity for handing over telecommunication data traffic between a first nominal gateway to a relay satellite of a space telecommunication system to a second redundant gateway to the same satellite when a first access link of the first nominal gateway undergoes or will undergo an attenuation which does not allow the first nominal gateway to ensure a correct transmission of the traffic to the satellite, wherein
the handover method comprises a handover preparation phase and a handover execution phase, which is then executed, wherein a first switchover of the traffic at the ground segment level between the first nominal gateway and the second redundant gateway, and a second switchover at the level of the segment on board the satellite between the first nominal access link and a second redundant access link from the second redundant gateway to the satellite are finely synchronized with one another.

2. The soft handover method with gateway diversity according to claim 1, wherein
the first switchover of the traffic at the ground segment level between the first nominal gateway and the second redundant gateway is executed before the second switchover at the level of the segment on board the satellite between the first nominal access link and the second redundant access link, and
from the first switchover at the ground segment level of the data traffic to the second redundant gateway, the first nominal gateway and the second redundant gateway are simultaneously active, and both remain active until the start of the second switchover at the level of the segment on board to the second redundant access link, where only the first nominal gateway is then deactivated.

3. The soft handover method with gateway diversity according to claim 1, wherein
the first switchover of the traffic at the ground segment level between the first nominal gateway and the second redundant gateway is executed before the second switchover at the level of the segment on board the satellite between the first nominal access link and the second redundant access link, and
from the first switchover at the ground segment level of the data traffic to the second redundant gateway, the second redundant gateway buffers the incoming data traffic switched over at the ground level by a sufficient number of empty frames to allow satellite terminals of the space telecommunication system to be resynchronized as quickly as possible.

4. The soft handover method with gateway diversity according to claim 3, wherein
in parallel, the first nominal gateway empties a buffer memory containing the traffic data not yet transmitted at the moment of the start of the first switchover of the traffic at the ground level between the first and second gateways.

5. The soft handover method with gateway diversity according to claim 1, wherein
the preparation phase comprises a step of configuration of the second redundant gateway with the configuration of the first nominal gateway.

6. The soft handover method with gateway diversity according to claim 1, wherein
the preparation phase comprises a step of sending of a satellite remote control TC to the satellite to modify all of the on board switching matrix of the satellite at a specified switching date.

7. The soft handover method with gateway diversity according to claim 1, wherein
the preparation phase comprises a step of sending of a satellite remote control TC to the satellite to modify all of the on board switching matrix of the satellite at a specified switching date, followed by a step of configuration of the second redundant gateway with the configuration of the first nominal gateway.

8. The soft handover method with gateway diversity according to claim 1,
comprising a step of decision-making on the performance of a soft handover with gateway diversity on the basis of a forecast of the events of unavailability of the first nominal access link supplied by the first nominal gateway based on a weather forecast model or an estimator of the channel supported by the first nominal access link, the second redundant gateway on which the handover will take place, the date and the duration of the handover being identified in the handover decision.

9. A space telecommunication system for softly handing over telecommunication data traffic between a first nominal gateway to a space telecommunication relay satellite to a second redundant gateway to the same satellite when a first access link from the first nominal gateway undergoes or will undergo an attenuation which does not allow the first nominal gateway to ensure a correct transmission of the traffic to the satellite, the space telecommunication system comprising
the telecommunications relay satellite, and
the first nominal gateway and the second redundant gateway, and
a high bit rate ground network infrastructure interconnecting gateways and supplied with data traffic at a predetermined network entry point, and
a plurality of space terminals using telecommunications services, and
a coordination and control station of the space telecommunications system, and
a TMTC station for receiving telemetry information TM and transmitting remote controls TC from and to the satellite;
the space telecommunication system wherein it is configured to implement a soft handover method comprising a handover preparation phase and a handover execution phase that are executed in succession,
a first switchover of the traffic at the ground segment level from the first nominal gateway to the second redundant gateway, and a second switchover at the level of the segment on board the satellite between the first nominal access link and a second redundant access link from the second redundant gateway being finely synchronized during the soft handover execution phase.

10. The space telecommunication system for softly handing over telecommunications data traffic between two gateways according to claim 9, wherein
the first nominal gateway, the second redundant gateway and the satellite are configured to synchronously execute the first switchover of the traffic at the ground segment level between the first nominal gateway and the second redundant gateway before the second switchover at the level of the segment on board the satellite between the first nominal access link and the second redundant access link, and
the first nominal gateway and the second redundant gateway are configured to be simultaneously active from the start of the first switchover at the ground segment level of the data traffic to the second redundant gatewaym to both remain active until the second switchover at the level of the on board segment to the second redundant access link, only the first nominal gateway being deactivated during and after the second switchover at the level of the segment on board the satellite.

11. The space telecommunications system for softly handing over telecommunication data traffic between two gateways according to claim 9, wherein
the first nominal gateway, the second redundant gateway and the satellite are configured to synchronously execute the first switchover of the traffic at the ground segment level between the first nominal gateway and the second redundant gateway before the second switchover at the level of the segment on board the satellite between the first nominal access link and the second redundant access link, and
the second redundant gateway is configured to, from the first switchover at the ground segment level of the data traffic to the second redundant gateway, buffer the incoming data traffic switched at the ground level by a sufficient number of empty frames to be transmitted to allow the satellite terminals of the satellite telecommunication system to be resynchronized as quickly as possible.

12. The space telecommunication system for softly handing over telecommunication data traffic between two gateways according to claim 11, wherein
the first nominal gateway is configured to, from the start of the first switchover of the traffic at the ground level to the second redundant gateway, empty at least one of its buffer memories containing the traffic data not yet transmitted at the moment of the start of the first switchover of the traffic at the ground level between the first and second gateways.

13. The space telecommunication system for softly handing over telecommunication data traffic between two gateways according to claim 9, wherein
the coordination and control station of the space telecommunication system is configured to
take a decision to perform a soft handover with gateway diversity on the basis of a forecast of the events of unavailability of the first nominal access link of the first nominal gateway, said forecast being determined on the basis of a weather forecast model or an estimation of the state of the channel supported by the first nominal access link, an identification of the second redundant gateway on which the handover will take place, the date and the duration of the handover being identified in said handover decision, and to
control and carry out a scheduling of the steps of the handover preparation phase, said preparation phase comprising a step of sending of a satellite remote control TC to the satellite to modify all of the on board switching matrix of the satellite at a specified switching date, and a step of configuration of the second redundant gateway with the configuration of the first nominal gateway.

14. The space telecommunication system for softly handing over telecommunications data traffic between two gateways according to claim 13, wherein
the synchronization between the first switchover of the traffic at the ground segment level to the second redundant gateway, and the second switchover at the level of the segment on board the satellite between the first nominal access link and the second redundant access link is prepared by the coordination and control station,
through the sending by the coordination and control station to the first and second gateways of a time set point of the instant of triggering of the traffic switchover at the ground segment level, and
through the sending by the remote control transmission station TC of a satellite remote control TC to the satellite to modify all of the on board switching matrix of the satellite at a specified switching date by said coordination and control station.

* * * * *